(12) United States Patent
Tooman et al.

(10) Patent No.: US 10,717,218 B2
(45) Date of Patent: Jul. 21, 2020

(54) HOT RUNNER SYSTEM FOR INJECTION MOLDING

(71) Applicant: PLASTIC ENGINEERING & TECHNICAL SERVICES, INC., Auburn Hills, MI (US)

(72) Inventors: Patrick A. Tooman, Clarkston, MI (US); Bruce Casey, White Lake, MI (US)

(73) Assignee: Plastic Engineering & Technical Services, Inc., Auburn Hills, MI (US)

( * ) Notice: Subject to any disclaimer, the term of this patent is extended or adjusted under 35 U.S.C. 154(b) by 163 days.

(21) Appl. No.: 15/927,519

(22) Filed: Mar. 21, 2018

(65) Prior Publication Data

US 2019/0291320 A1   Sep. 26, 2019

(51) Int. Cl.
*B29C 45/28*   (2006.01)
*B29C 45/27*   (2006.01)

(52) U.S. Cl.
CPC ...... *B29C 45/2806* (2013.01); *B29C 45/2737* (2013.01)

(58) Field of Classification Search
CPC ............ B29C 45/2806; B29C 45/2737; B29C 45/14811; B29C 45/14827
See application file for complete search history.

(56) References Cited

U.S. PATENT DOCUMENTS

| 2014/0302193 A1* | 10/2014 | Olaru | B29C 45/2737 |
| | | | 425/549 |
| 2016/0059459 A1* | 3/2016 | Keitel | B29C 45/281 |
| | | | 264/297.2 |
| 2016/0288389 A1* | 10/2016 | Olaru | B29C 45/2735 |

* cited by examiner

*Primary Examiner* — Timothy Kennedy
*Assistant Examiner* — Farah Taufiq
(74) *Attorney, Agent, or Firm* — Warner Norcross + Judd LLP

(57) ABSTRACT

An improved hot runner system is provided. The hot runner system includes a hot drop having an inlet for receiving molten material, the inlet diverging into first and second channels that converge at a feeder tube for providing an even distribution of molten material in a mold cavity. The hot runner system further includes a valve pin adapted to reciprocate within the feeder tube for opening and closing the valve gate, the valve pin being moveable in response to activation of first and second linear actuators disposed exterior to the hot drop. The linear actuators are moveable in unison with each other and are joined to the valve pin via a cross-bar that extends through an interior portion of the hot drop between the first and second channels.

19 Claims, 4 Drawing Sheets

HOT RUNNER SYSTEM FOR INJECTION MOLDING

FIELD OF THE INVENTION

The present invention relates to hot runner systems for injection molding, and in particular, plastic injection molding.

BACKGROUND OF THE INVENTION

Hot runner systems include the transfer of a molten material into a mold at high pressures. For plastic injection molding hot runner systems, an injection unit melts pelletized plastic into molten plastic before injecting the molten plastic into a closed mold. In its most basic configuration, the mold includes two halves, a core half and a cavity half, which cooperate to define a mold cavity in the desired shape of a single part. The molten plastic cools and solidifies between the mold halves, and is ejected from the mold cavity as a finished part.

Hot runner systems also include a hot drop for directing the flow of molten material to a valve gate. Hot drops generally include a feed hole and an electrical heating unit, such as a heater band, around a nozzle body. Molten material flows through the hot drop to the valve gate where it enters the mold cavity. A valve pin moves away from and toward the mold opening to open and close the valve gate, respectively, to selectively allow molten material into the mold cavity. This process is repeated for each successive shot of molten material.

In some operations, hot runner systems can leave a witness mark on the finished part generally equal to the valve gate diameter. The witness mark, or other surface imperfection, can also arise in the absence of an even distribution of molten material at the valve gate opening. Accordingly, there remains a continued need for a hot runner system providing an improved distribution of molten material at the valve gate opening. In particular, there remains a continued need for a hot runner system that minimizes the presence of witness marks and other imperfections on the finished part for plastic injection molding and other operations.

SUMMARY OF THE INVENTION

An improved hot runner system is provided. The hot runner system includes a hot drop having an inlet for receiving molten material, the inlet diverging into first and second channels that converge near a valve gate. The hot runner system further includes a valve pin for opening and closing the valve gate, the valve pin being coupled to first and second linear actuators by a cross-bar. The linear actuators raise and lower the cross-bar in unison, which extends transversely through the hot runner system between the first and second channels.

In one embodiment, the hot drop includes a drop body and a drop fork that cooperate to define the first and second channels therein. More particularly, the first and second channels diverge in the drop fork and converge in the drop body. Each of the drop fork and the drop body are surrounded by heater bands having internal electrical heater elements to maintain molten material within the hot drop above the working temperature of the mold.

In another embodiment, the first and second linear actuators each include an internal piston and are operable in unison with each other. The first and second linear actuators are disposed laterally outward of the hot drop, being disposed between a base plate and a top plate that overlie each other, the base plate being further joined to a mold half.

The hot runner system of the present embodiment is particularly well suited for providing a uniform distribution of molten material at a valve gate and for minimizing the presence of witness marks and other imperfections on the finished part in plastic injection molding operations. These and other features and advantages of the present invention will become apparent from the following description of the invention, when viewed in accordance with the accompanying drawings and appended claims.

DETAILED DESCRIPTION OF THE CURRENT EMBODIMENT

Figure 1:
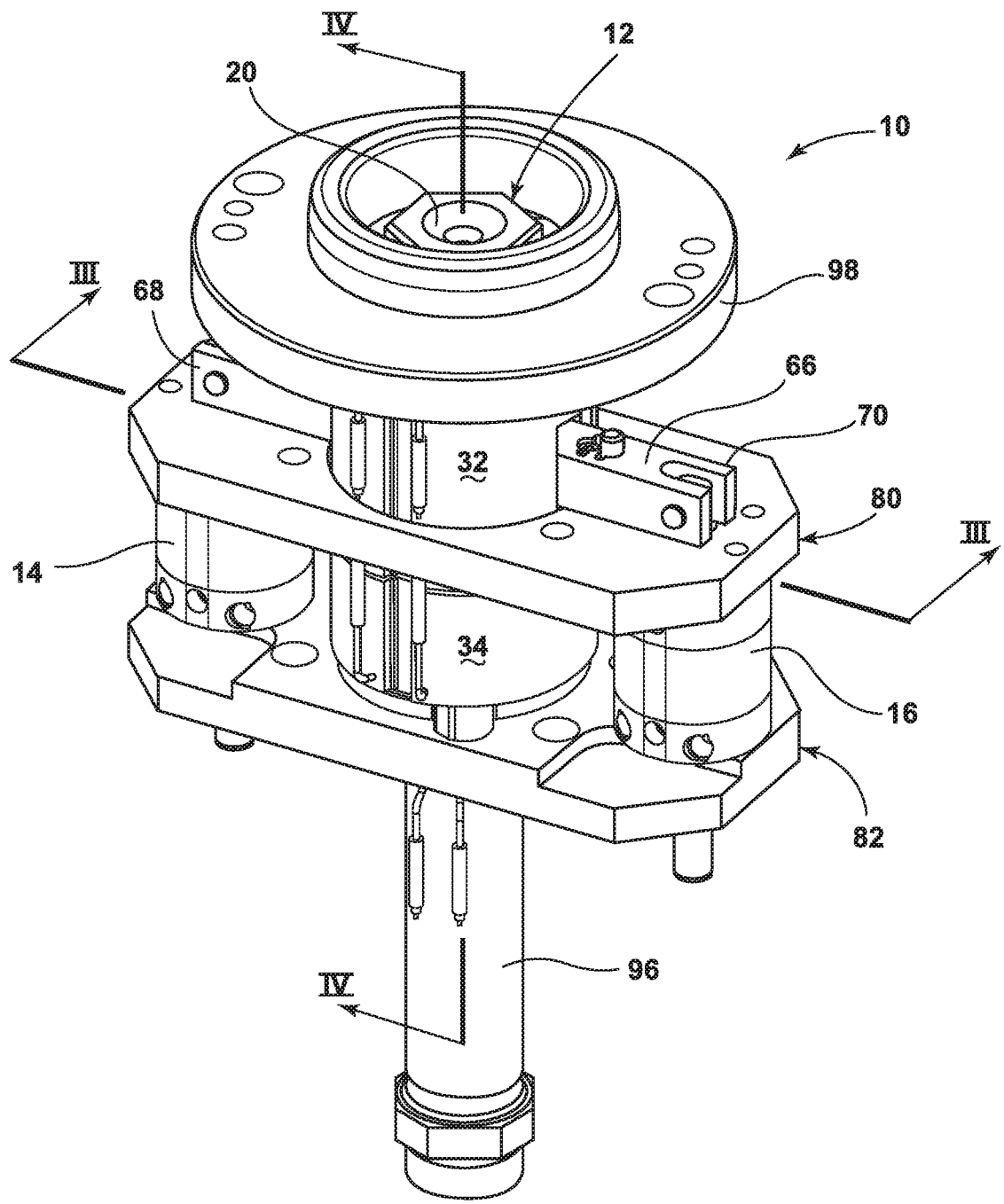
FIG. 1 is a perspective view of a hot runner system in accordance with one embodiment.
Figure 2:
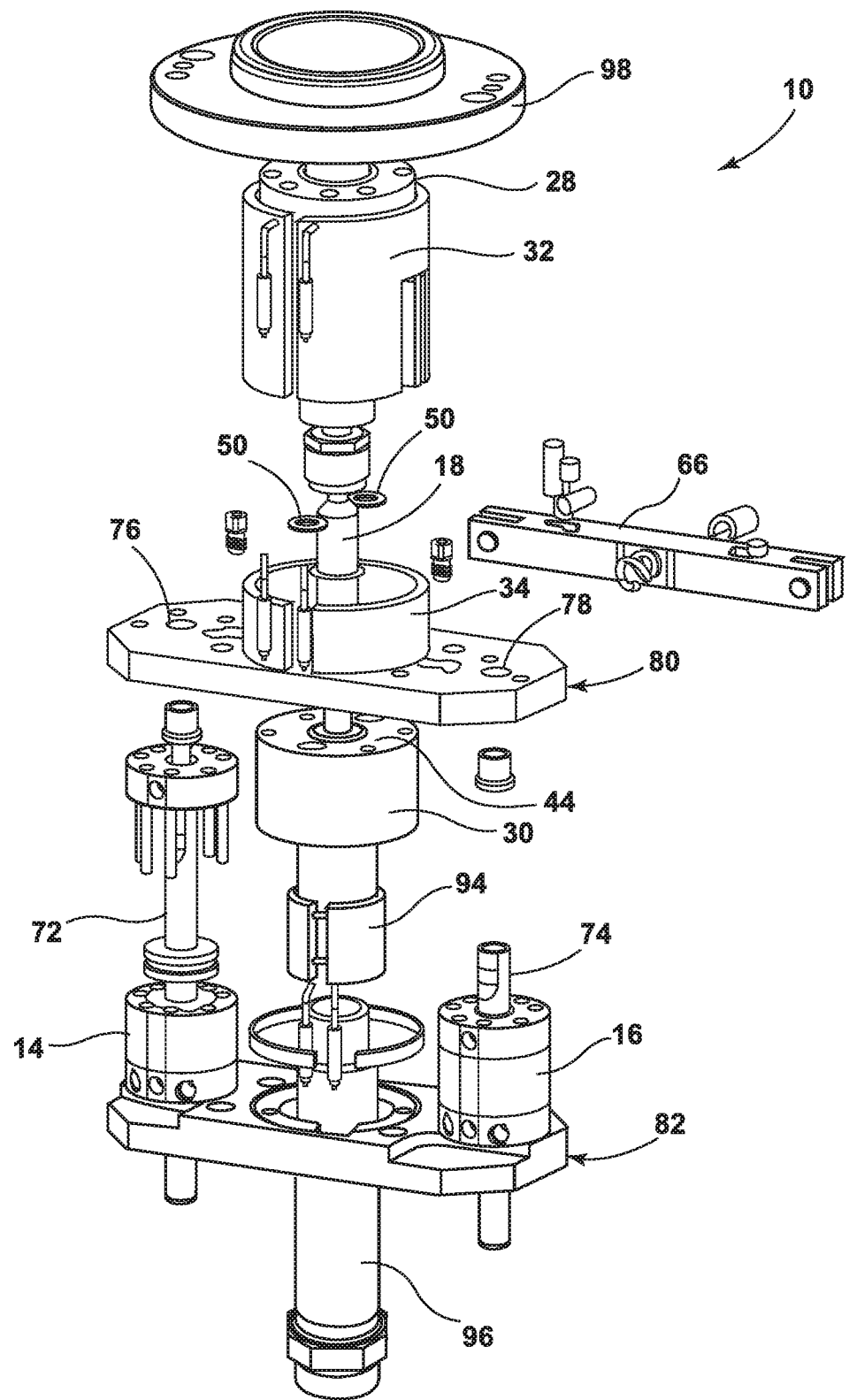
FIG. 2 is an exploded view of the hot runner system of FIG. 1.

Referring to FIGS. 1-4, wherein like numerals indicate corresponding parts through the several views, a hot runner system is illustrated and generally designated 10. The hot runner system 10 includes a hot drop 12, first and second linear actuators 14, 16, and a valve pin 18. The hot drop 12 includes an inlet 20 that forks into two channels 22, 24 that converge at or near a valve gate for providing a uniform distribution of molten material in a mold cavity. Each such feature of the hot runner system 10 is separately described below.

Figure 4:
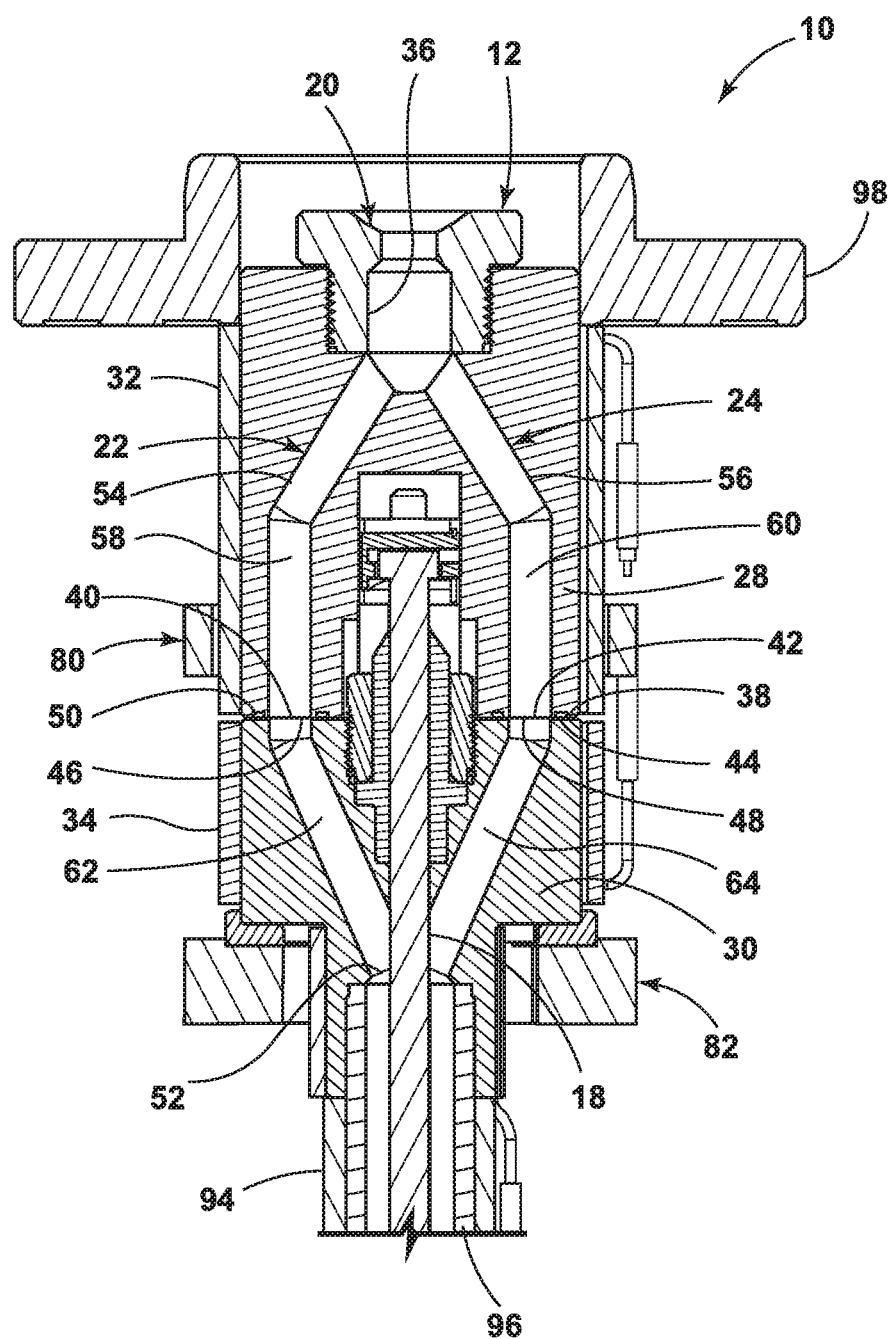
FIG. 4 is a cross-sectional view of the hot runner system of FIG. 1 taken along line IV-IV.

The hot drop 12 includes a drop fork 28 and a drop body 30, each being surrounded by a respective heater band 32, 34 to maintain the temperature of molten material within the hot drop 12 above a minimum temperature. As best shown in FIG. 4, the hot drop inlet 20 opens to a chamber 36 that diverges within the drop fork 28 into the first and second channels 22, 24. The first and second channels 22, 24 slope outwardly to extend around the valve pin 18 and continue within the drop fork 28 parallel to the valve pin 18. The drop fork 28 includes a lower surface 38 defining first and second openings 40, 42 corresponding to the first and second channel 22, 24, respectively.

The drop body 30 includes an upper surface 44 in abutment with the lower surface 38 of the drop fork 28. The upper surface 44 of the drop body 30 includes first and second openings 46, 48 in alignment with the first and second openings 40, 42 of the drop fork 28. Crush washers 50 surround these openings to maintain a seal between the drop fork 28 and the drop body 30. The openings 46, 48 in the upper surface 44 of the drop body 30 correspond to first and second channels 22, 24, respectively. The first and second channels 22, 24 meet at a convergence 52, which is nearer to a valve gate than the hot drop inlet 36.

The hot drop 12 therefore defines first and second channels 22, 24 having diverging portions 54, 56, parallel portions 58, 60, and converging portions 62, 64. The diverging portions 54, 56 are entirely defined within the drop fork 28, the parallel portions 58, 60 are defined in both of the drop fork 28 and the drop body 30, and the converging portions 62, 64 are entirely defined in the drop body 30. The first and second heater bands 32, 34 ensure the molten material moving through the first and second channels 22, 24 is above a minimum temperature.

Figure 3:
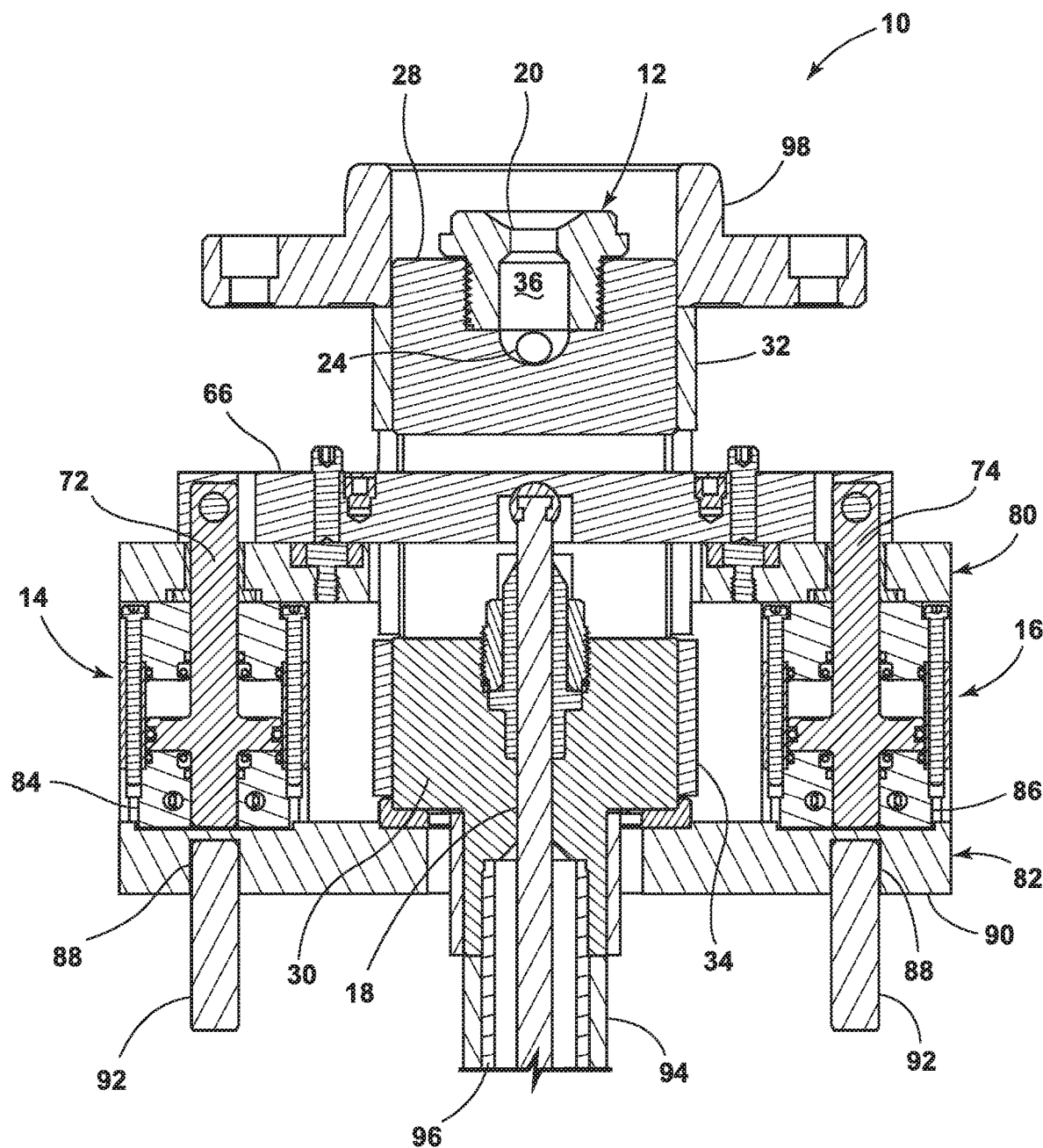
FIG. 3 is a cross-sectional view of the hot runner system of FIG. 1 taken along line III-III.

The valve pin 18 reciprocates within the hot drop 12 under control of two linear actuators 14, 16. The linear actuators 14, 16 are electric actuators in the current embodiment, but can be hydraulic or pneumatic actuators in other embodiments. The valve pin 18 is fixedly joined to a cross-bar 66 that extends laterally across and through a break in the hot drop 12 (in particular, the drop fork 28), orthogonal to the direction of the first and second channels 22, 24. The cross-bar 66 is joined at first and second end portions 68, 70 to respective first and second piston rods 72, 74 from the first and second linear actuators 14, 16. The piston rods 72, 74 extend through respective openings 76, 78 in a top plate 80. As shown in FIGS. 1 and 3, the top plate 80 positioned opposite a base plate 82, with the linear actuators 14, 16 being secured therebetween with a series of bolts or screws. Each piston rod 72, 74 is joined to an internal piston 84, 86 that is self-contained within a linear actuator 14, 16. The linear actuators 14, 16 operate in concert, such that the piston 84 of the first linear actuator 14 moves in perfect unison with the piston 86 of the second linear actuator 16.

As also depicted in the drawings, the base plate 82 includes multiple dowel openings 88 on a lower surface 90 thereof, the dowel openings receiving dowels 92 for holding the base plate 82 to a mold half. The hot runner system 10 includes a further heater band 94 extending around a feeder tube 96 toward a mold cavity. A cap plate 98 sits atop the hot drop 12 generally even with the hot drop inlet 20.

In operation, molten material is feed to the hot drop inlet 20 at a temperature higher than the working temperature of the mold. The molten material enters a feed chamber 36 in fluid communication with first and second channels 24, 26. The molten material passes through the first and second channels 24, 26, which diverge from the feed chamber 36 and connect at a convergence 52. The convergence 52 is in fluid communication with the feeder tube 96, which terminates at a valve gate having a reduced diameter opening for discharging molten material being fed through the feed passage. As depicted in FIGS. 1-4, the hot drop 12 is encircled with heater bands 32, 34, 94 which are energized through an electrical control system. The heater bands 32, 34, 94 operate at a temperature significantly above the mold to prevent solidification of the molten material within the hot drop 12. The linear actuators 14, 16 work in unison to raise and lower the cross-bar 66, which is rigidly coupled to valve pin 18. In response to the raising and lowering of the cross-bar 66, the valve pin 18 reciprocates through the hot drop 12, and in particular, through a portion of the drop fork 28 and the entirety of the drop body 30. The valve pin 18 extends through the feeder tube 96 and is used to control the flow of molten material into the mold cavity. More particularly, the valve pin 18 is raised at the beginning of the injection cycle and lowered at the end of the injection cycle. Though not shown, the head of the valve pin 18 includes a tapered portion that forms a gap with the surface of a reduced diameter nozzle. By increasing or decreasing the size of the tap, the valve pin 18 correspondingly increases or decreases the flow of molten material through the gate. Although a hot runner system is depicted in which molten plastic is injected, the present invention is applicable to other materials.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. Any reference to elements in the singular, for example, using the articles "a," "an," "the," or "said," is not to be construed as limiting the element to the singular.

The invention claimed is:

1. A hot runner system comprising:
   a hot drop having an inlet for receiving molten material, the inlet diverging into first and second channels;
   first and second linear actuators coupled to a cross-bar, the cross-bar extending laterally through an opening in the hot drop in a region between parallel portions of the first and second channels, wherein the cross-bar reciprocates vertically in a direction transverse to a lengthwise axis of the cross-bar in the region between the parallel portions of the first and second channels; and
   a valve pin fixedly coupled to the cross-bar and adapted to reciprocate in unison with the cross-bar within the hot drop for opening a valve gate, wherein the first and second channels include converging portions that converge below the opening in the hot drop at an inlet to a feeder tube encompassing the valve pin.

2. The hot runner system of claim 1 wherein the hot drop includes a drop body and a drop fork that cooperate to define the first and second channels therein.

3. The hot runner system of claim 2 further including a first heater band disposed about the drop fork and a second heater band disposed about the drop body.

4. The hot runner system of claim 1 wherein each of the first and second linear actuators includes an internal piston that are operable in unison with each other.

5. The hot runner system of claim 1 wherein the first and second linear actuators are mounted to a base plate, the feeder tube extending through an opening in the base plate.

6. The hot runner system of claim 5 wherein the base plate is coextensive in size with a top plate, the first and second linear actuators being secured therebetween.

7. A hot runner system comprising:
   a hot drop having an inlet for receiving molten material from an injection unit, the inlet being in fluid communication with first and second channels;
   a valve pin adapted to reciprocate within the hot drop for opening a valve gate; and
   first and second linear actuators mechanically coupled to a cross-bar that extends laterally through an opening in the hot drop between parallel portions of the first and second channels,
   wherein the cross-bar reciprocates vertically in a direction transverse to a lengthwise axis of the cross-bar in the opening between the parallel portions of the first and second channels,
   wherein the valve pin is fixedly coupled to the cross-bar and reciprocates in unison with the crossbar to raise and lower within the hot drop,
   wherein the first and second channels include converging portions that converge below the opening at an inlet to a feeder tube encompassing the valve pin for directing the molten material to the valve gate.

8. The hot runner system of claim 7 wherein the hot drop includes a drop body and a drop fork that cooperate to define the first and second channels therein.

9. The hot runner system of claim 8 wherein the first and second channels diverge in the drop fork and converge in the drop body.

10. The hot runner system of claim 8 further including a first heater band disposed about the drop fork and a second heater band disposed about the drop body.

11. The hot runner system of claim 7 wherein each of the first and second linear actuators includes an internal piston that are operable in unison with each other.

12. The hot runner system of claim 7 wherein the first and second linear actuators are disposed laterally outward of the hot drop.

13. The hot runner system of claim 7 wherein the first and second linear actuators are mounted to a base plate, the valve pin extending through an opening in the base plate.

14. The hot runner system of claim 13 wherein the base plate is coextensive in size with a top plate, the first and second linear actuators being secured therebetween.

15. The hot runner system of claim 13 wherein the base plate is secured to a mold using a plurality of dowels.

16. A hot runner system comprising:
a hot drop having an inlet for receiving molten material, the inlet diverging into first and second channels, the first and second channels converging distal from the inlet;
first and second linear actuators coupled to a cross-bar, the cross-bar extending laterally through an opening in the hot drop in a direction orthogonal to the first and second channels and between parallel portions of the first and second channels, wherein the cross-bar reciprocates vertically in a direction transverse to a lengthwise axis of the cross-bar; and
a valve pin fixedly coupled to the cross-bar and extending through a feeder tube in fluid communication with the first and second channels, the valve pin being adapted to reciprocate in unison with the cross-bar for opening a valve gate, wherein the first and second channels converge below the opening in the hot drop at an inlet to the feeder tube.

17. The hot runner system of claim 16 wherein the hot drop includes a drop body and a drop fork that cooperate to define the first and second channels therein.

18. The hot runner system of claim 17 further including a first heater band disposed about the drop fork and a second heater band disposed about the drop body.

19. The hot runner system of claim 16 wherein each of the first and second linear actuators includes an internal piston that are operable in unison with each other.

* * * * *